INVENTOR
KENNETH W. VAUGHAN
BY Merchant, Merchant & Gould
ATTORNEYS

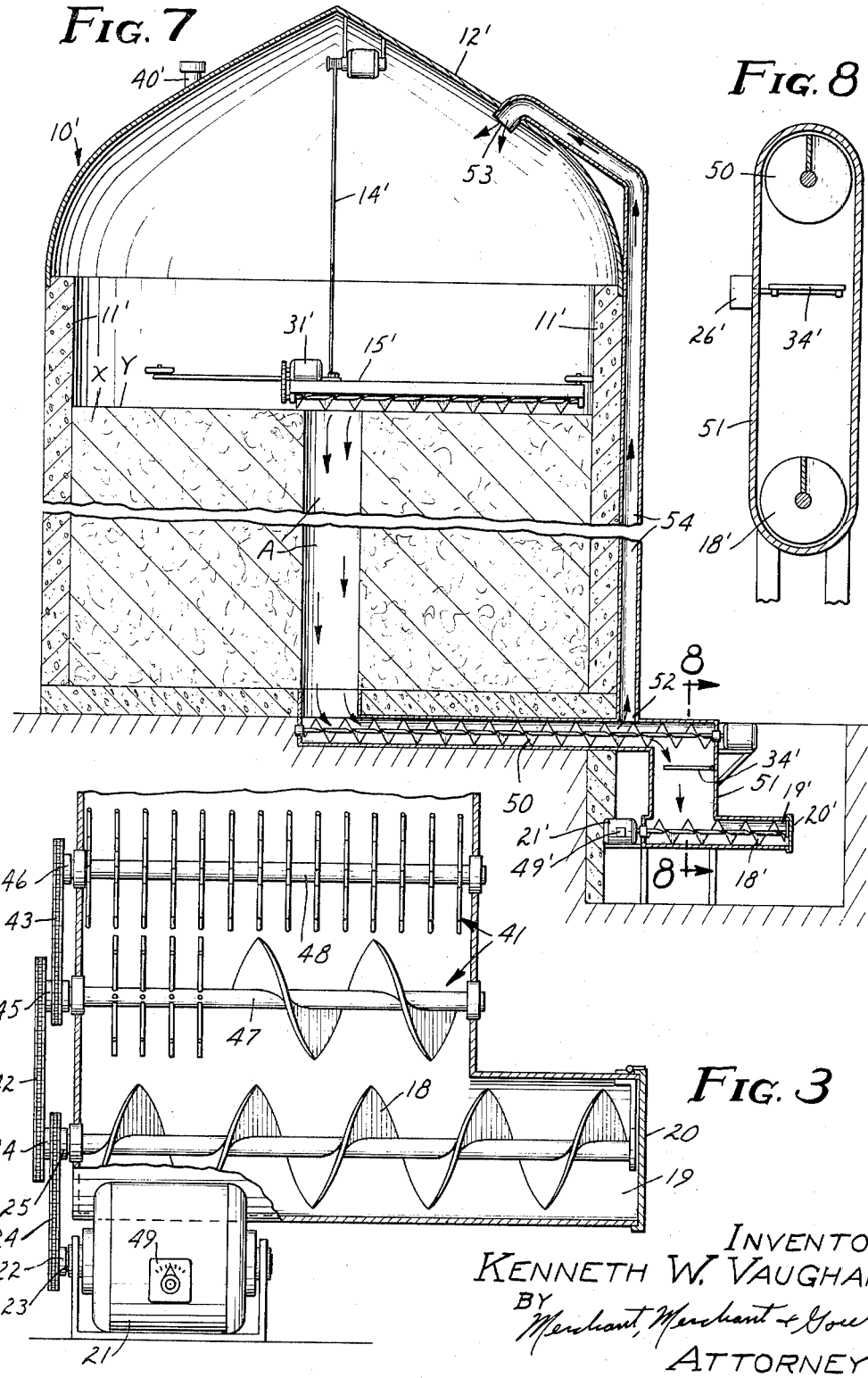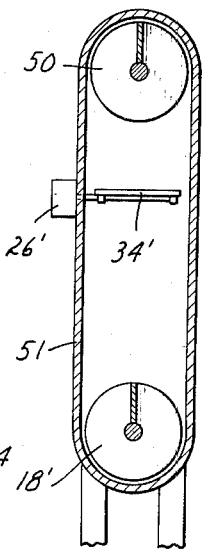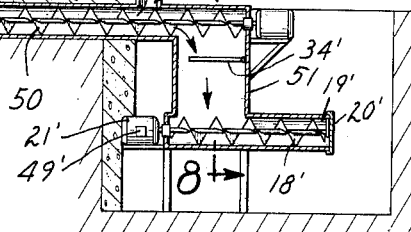

United States Patent Office 3,251,292
Patented May 17, 1966

3,251,292
MEANS FOR CONSERVING THE GASES OF OXIDATION AND FERMENTATION DURING MECHANICAL UNLOADING OF SILOS AND THE LIKE
Kenneth W. Vaughan, 715 6th Ave. SE.,
Aberdeen, S. Dak. 57401
Filed Nov. 30, 1964, Ser. No. 414,745
8 Claims. (Cl. 99—235)

My invention relates to storage structures that are designed for storage of food crops for animal or human consumption, such storage crops hereinafter being referred to by the well-known term "silage."

More specifically, my invention relates to improvements in silo-like storage structures which are, or can be made, substantially air-tight.

When fresh plant material is placed within a substantially air-tight structure, the living cells of the plant continue to respire and produce thereby an appreciable amount of carbon dioxide. Additional carbon dioxide and other gaseous compounds are produced through the conversion of the free oxygen in the entrapped air. This conversion is substantially completed in a very few hours. If air containing free oxygen, such as normal air from the outside atmosphere, does not gain entrance to the fermented material, it may be stored for extended periods of time with very little change in dry matter weight or nutritive value for animals. However, the carbon dioxide and other gaseous products that are heavier than normal air tend to "flow" or move to areas of less elevation if possible. During the unloading process of such a storage structure from the top, wherein the stored material is moved down from doors in the sidewalls, the carbon dioxide is lost through flow down the chute with the stored material, also by virtue of its weight as a gas, and in the case of movement of the stored material by movement caused by a fan, by virtue of the fan movement itself. In the case of a structure that is unloaded from the top through a center duct formed from the stored material, the carbon dioxide is lost by virtue of its weight as a gas and the movement caused by the falling stored material through the duct. In the case of a bottom unloader, the carbon dioxide within the bridge or domed area is lost when the unloader door is removed for unloading because of flow to a lower area and because of the mechanical movement of the unloading mechanism.

Whenever the foregoing occurs, the oxygen-free gases are replaced by air from the atmosphere through a variety of devices designed to prevent the collapse of the structure. When this air containing free oxygen contacts the stored material, the silage thereat will spoil, heat, or in some cases actually reach a kindling point and burn until the oxygen is exhausted. To keep ahead of such spoilage, silage is normally removed at a rate of two to four inches a day from a structure that is substantially air-tight. Substantially air-tight structures in and of themselves, however, have not been able to eliminate the losses due to replacement of the carbon dioxide lost during the unloading process.

The primary object of my invention is the provision of novel means, utilizable in a substantially air-tight silage storage structure, whereby loss of carbon dioxide and other gaseous products of previous oxidation and fermentation is reduced to a minimum during periods of silage removal by power-operated silo unloading and conveying systems.

As above indicated, during unloading operations with mechanical power-operated unloaders, it is inevitable that a certain amount of the gases of oxidation and fermentation are removed from the silo in the stream of the discharge silage. In fact, such silage during discharge is largely carried in such gases. A further and highly important object of my invention is the provision of novel means whereby such gases of fermentation and oxidation may be effectively and continuously removed from the discharge stream of said silage and returned to the silo, above the silage level thereof.

A further object of my invention is the provision of novel means for effecting an air lock adjacent the discharge end of the silage discharge conduit means, whereby such gases of oxidation and fermentation may be forced and/or drawn back into the silo, above the silage level thereof, due to partial vacuum created by removal of silage, and/or by means of the circulation set up by the silage impelling-discharge mechanism within the silo.

A further object of my invention is the provision of mechanism of the type immediately above described in which the silo discharge conduit means includes a vertically disposed leg, preferably exteriorly of the silo, into the upper end of which the silage is delivered by the unloader within the silo, and which includes a horizontally disposed discharge conveyor in the lower end of said leg, in combination with novel means for maintaining the silage within the lower end of said leg within predetermined levels above said discharge conveyor, whereby to assure a constant air lock between the lower end of said leg and atmosphere. This arrangement assures constant return of the gaseous products of fermentation and oxidation to said silo.

A further object of my invention is the provision of a device of the class generally above described which incorporates but a minimum of working parts, is highly efficient and foolproof in its operation, and is rugged and durable in construction.

A further object of my invention is the provision of a device of the class above described which may be, with equal facility, adapted for installation in new relatively air-tight silos, or alternatively, which may be attached to previously constructed silos of this type.

The above and still further objects of my invention will become apparent from the following detailed specification, appended claims, and attached drawings.

Referring to the drawings wherein like characters indicate like parts throughout the several views:

FIG. 3 is a view in vertical section as seen generally along the line 3—3 of FIG. 2, on an enlarged scale, portions thereof being broken away;

FIG. 6 is a schematic wiring diagram;

FIG. 7 is a view in axial section of a different type of silo construction and showing a modified embodiment of the silage discharge structure of FIG. 1 utilized therewith; and FIG. 8 is a view in vertical section as seen from the line 8—8 of FIG. 7.

Figure 1:
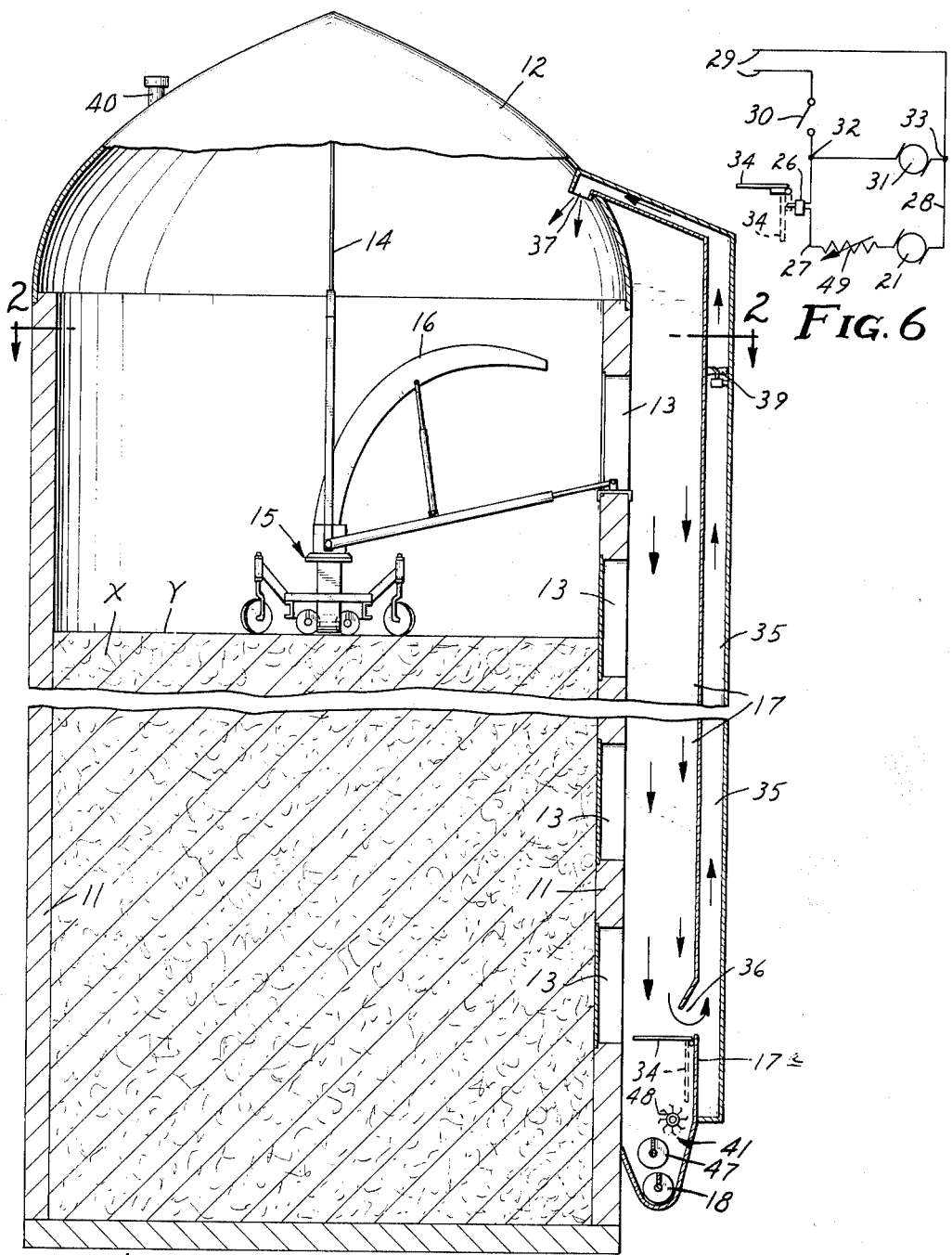
FIG. 1 is a view in side elevation of a conventional silo showing my novel silage discharge mechanism thereon, portions thereof broken away and shown in section.

Referring with greater particularity to the drawings, and initially to FIGS. 1-6 thereof, the numeral 10 indicates in its entirety a conventional silo of the vertical type, the cylindrical side wall thereof being identified by 11, the dome-like roof by 12, and the vertically spaced doors 13 in the side wall 11 by 13. The side wall 11 and doors 13 together with the roof 12 cooperate to define a relatively air-tight structure. Suspended in well-known manner within the interior of the silo 10 by means of cable 14 or the like, is a conventional power-operated unloader unit 15, which, also in well-known manner, removes silage X from the upper surface Y and impels same through door 13 at the proper level by means of a power-operated fan, not specifically shown, and an arcuate delivery spout 16.

Silage removed by unloader 15 is ejected or blown from the spout 16 through a selected one of the doors 13 and is received within the upper end portion of a vertically disposed relatively air-tight discharge leg or conduit 17.

At its extreme lower end the leg 17 is provided with a horizontally disposed helical auger 18 which discharges silage to atmosphere through an open end 19, which, as shown, is provided with a hinged cap 20. Cap 20 is removed during discharge operations, but replaced during periods of disuse to positively seal said opening 19.

Discharge auger 18 is rotated by means of an electric motor 21, having a sprocket 22 on its driveshaft 23, and a link chain 24 entrained over sprocket 22 and over a second sprocket 25 fast on one end of the auger 18. Starting and stopping movements are imparted to the motor 21, for the purpose of imparting and terminating discharge movements to the auger 18, by means of a switch 26. As shown, switch 26 is interposed in an electrical circuit, see FIG. 6, wherein the circuit is comprised of lead lines 27, 28, connecting opposite poles of said motor 21 to a source of power 29. Switch 26, as shown, is connected in series with lead line 27. A master switch 30 is also interposed in lead line 27. As also shown in the diagram of FIG. 6, there is a motor 31 adapted to impart and terminate unloading movements to the unloader 15, opposite poles of motor 31 being connected in parallel to lead lines 27, 28, as indicated at 32, 33, respectively.

Figure 2:
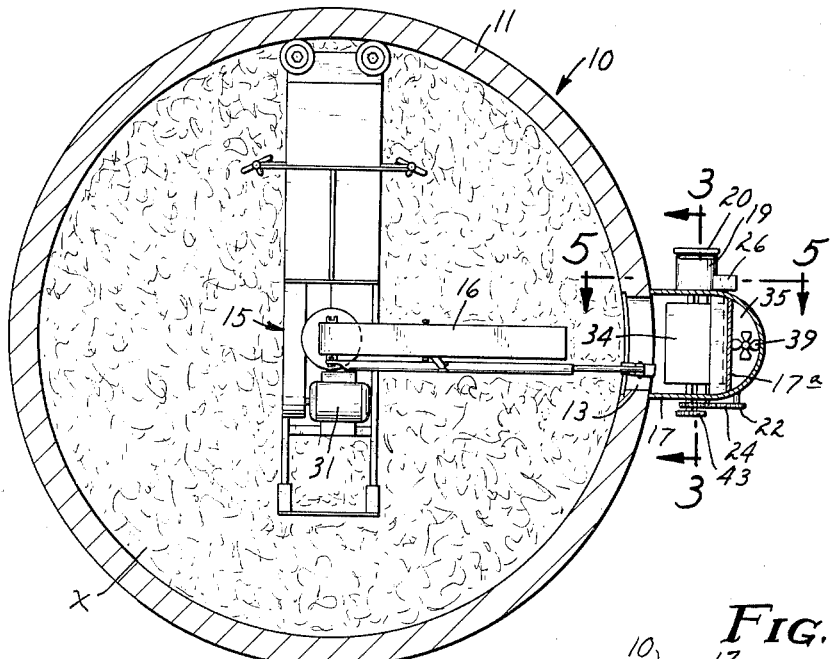
FIG. 2 is a view in horizontal section as seen from the line 2—2 of FIG. 1.
Figure 5:
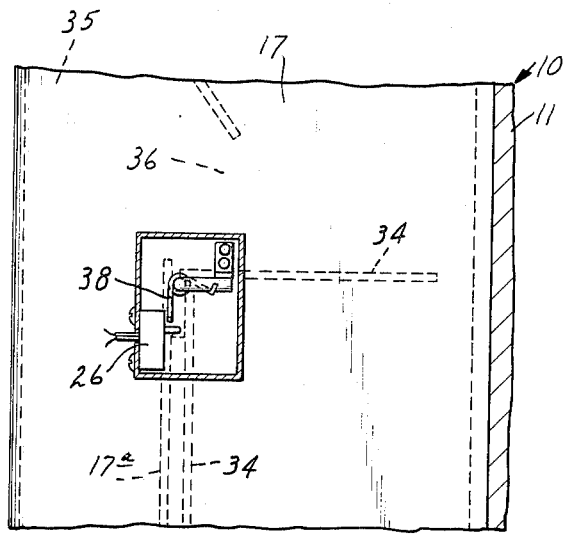
FIG. 5 is an enlarged detail view in section as seen from the line 5—5 of FIG. 2.

Operatively connected to switch 26 is a plate-like control arm 34, which, as shown in FIGS. 1 and 2, is pivotally secured on a horizontal axis to the outer wall 17a of the leg 17 and is yieldingly biased toward the horizontally disposed full line position thereof, whereby to be disposed within the path of travel of silage X passing downwardly through said leg 17 under the action of gravity. It will be noted that the control arm 34 overlies and is vertically spaced from the discharge auger 18, said spacing, as will immediately hereinafter be described, being critical to the successful performance of my invention.

Shown as extending vertically in generally parallel relationship to the leg 17, is an elongated gas return conduit 35 which is formed at its lower end portion to define a mouth 36 communicating with the lower end portion of the leg 17 above the level of the plate-like control arm 34. The upper end of the gas return conduit 35 opens as indicated at 37 into the upper end portion of the silo 10, well above the level Y of the silage X therein.

Operation

When it is desired to remove silage X from within the silo 10, in accordance with the teachings of the present invention, the master switch 30 is closed whereby to energize the motor 31 and impart operative movements to the unloader 15. As the silage X removed from the surface Y by the unloader 15 is blown or otherwise impelled from the spout 16, through an adjacent door 13 into the upper end portion of the leg 17, it falls downwardly under the action of gravity to a point where it completely covers the auger 18 whereby to form an air lock between the interior of the leg 17 and atmosphere. The cap 20 may now be removed in view of the air lock established, for at this point the discharge auger 18 is not in operation. However, as the weight of the silage X engaging the control arm 34 becomes sufficiently great to depress same to its dotted line position, shown in FIG. 1, the switch 26 is closed, whereby motor 21 is then energized and thereby imparts discharge movements to the auger 18.

Appreciating that the rate of delivery of silage X to the upper end portion of the leg 17 by the unloader 15 may vary, depending on frozen or impacted condition of the silage X, or due to mechanical breakdown of the unloader 15, the control arm is so positioned with respect to the discharge auger 18 that the control arm will return to its full line horizontal position of FIG. 1, under the action of suitable yielding means such as torsion spring 38, so as to terminate discharge movements of the auger 18 while there is still a sufficient accumulation of silage X above the level of the auger 18 to form an air lock.

Under the conditions immediately above described, the gases of oxidation and fermentation removed from the interior of the silo 10 with the stream of silage X will automatically be separated out from said stream and forced upwardly through the gas return conduit 35 so as to be returned to the interior of the silo 10 through opening 37. While the circulation set up by the blower associated with the unloader 15 is normally adequate to cause return of the gases of oxidation and fermentation to the silo through the gas return conduit 35, an electric fan 39 may be interposed within said gas return conduit 35 as a booster if this is found necessary.

While it is true that a certain amount of atmosphere must be permitted to enter the interior of the silo 10, in direct proportion to the silage X removed therefrom, this may be accomplished by an inlet tube 40 in the roof 12 which is provided with suitable conventional pressure valve means.

Figure 4:
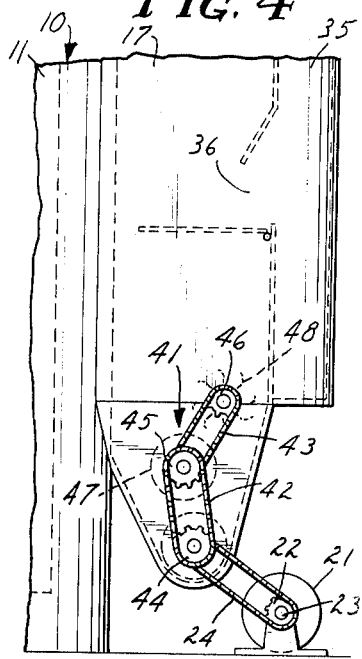
FIG. 4 is an enlarged detail view in elevation of a portion of the discharge conduit of FIG. 1.

For the purpose of preventing bridging of accumulated silage X in overlying relationship to the aguer 18, which would have the effect of breaking the air lock defined thereby, suitable rotary agitator means, identified in its entirety by 41, may be interposed in the lower end portion of the leg 17 in immediately overlying relationship to the auger 18. As shown in FIGS. 3 and 4, rotary movements may be imparted to said agitator means through the medium of link chains 42, 43 entrained over sprockets 44, 45, and 46. Sprocket 44, as shown, is carried by the extended end of auger 18 and sprockets 45, 46 are carried by the extended end of members 47, 48 of rotary agitator means 41.

For the purpose of varying the rate of discharge of auger 18 under conditions wherein it is desired to move a greater amount of silage, there is provided the variable voltage control 49. It will be appreciated that other suitable rate of discharge control means may be utilized, one example being a variable speed transmission not specifically shown.

In the modified structure shown in FIGS. 7 and 8, the silo is identified by 10′, the cylindrical side wall by 11′, the roof by 12′, and the unloader by 15′. Unloader 15′ is of the center unloading type which feeds the silage X removed from the surface Y during rotation thereof through a central opening A formed in the silage X at the time of the silo filling operation. Silage X, falling under the action of gravity through the central opening A, is received within and conveyed horizontally to the exterior of the wall 11′ by a helical auger 50, which, as shown, terminates at the upper end of a vertical discharge leg 51. Communicating with the upper end of the leg 51 as at 52 and extending vertically upwardly therefrom and finally terminating in an opening 53 within the silo 10, beneath the roof 12′ thereof and above the level Y of the silage X, is a gas return conduit 54.

All elements below the auger 50 and associated with the leg 51 are identical to and operate in the same manner as the corresponding elements in FIGS. 1 to 6, inclusive, and consequently bear like numerals, with prime marks added.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:

1. In a silo-like storage structure of substantially airtight construction having means associated therewith for removal of silage therefrom in a manner to minimize entry of air to the silo during said removal, said means comprising:
   (a) conduit means leading from the interior of said storage structure to atmosphere,
   (b) means for loosening and conveying stored silage from within said structure to atmosphere through said conduit means, and
   (c) means for separating gases of oxidation and fermentation from said discharge stream and returning same to said storage structure above the silage level thereof.

2. In a silo-like storage structure of substantially airtight construction having means associated therewith for removal of silage therefrom in a manner to minimize entry of air to the silo during said removal, said means comprising:
   (a) a vertically disposed silage discharge leg,
   (b) power-operated structure for loosening and conveying stored silage to the upper end portion of said leg,
   (c) means in the lower end portion of said leg for discharging silage therefrom to atmosphere,
   (d) means effecting an air lock between the lower end portion of said leg and atmosphere during discharge of said silage, and
   (e) conduit means leading from said leg above the level of said air lock means and terminating within said storage structure above the silage level thereof.

3. The structure defined in claim 2 in which the means called for in portion (c) includes:
   (1) a horizontally disposed power-operated conveyor leading from the lower end of said leg to atmosphere, and in which the means called for in portion (d) includes
   (2) means responsive to the weight of accumulated silage within said leg for controlling the output of said discharge conveyor after a sufficient amount of silage has been effected within said leg and above said conveyor to effect an air lock.

4. The structure defined in claim 3 in which:
   (1) said discharge conveyor is of the screw type,
   (2) the power means therefor is an electric motor, and
   (3) the control means for said motor is in the nature of a pressure-responsive switch in the path of travel of silage passing through said leg and positioned above the level of said screw conveyor,
   (4) said switch initiating discharge movements to said screw conveyor only after a sufficient quantity of silage is delivered into the lower end of said leg to preclude air from entering said leg through said screw conveyor, and terminating said delivery movements when said accumulated silage reaches a predetermined level.

5. In a silo-like storage structure of substantially airtight construction having means associated therewith for removal of silage therefrom in a manner to minimize entry of air to the silo during said removal, said means comprising:
   (a) a vertically disposed silage discharge leg,
   (b) power-operated means for loosening and conveying stored silage from said structure to the upper end portion of said leg,
   (c) power-operated coveyor means in the lower end portion of said leg for discharging silage therefrom to atmosphere,
   (d) control means associated with one of said power means and responsive to a predetermined accumulation of silage within said leg for establishing and maintaining a sufficient accumulation of silage in the lower end of said leg to establish and maintain a constant air lock above said discharge conveyor.

6. The structure defined in claim 5 in which:
   (a) said discharge conveyor is in the nature of a helical auger and in which,
   (b) the power means for said auger is an electric motor,
   (c) said control means including an electric switch and a pivoted control arm therefor within said leg and yieldingly biased toward a generally horizontal position within the path of travel of silage passing therethrough,
   (d) accumulated silage within said leg depressing said control arm against said yielding bias and imparting delivery movements to said discharge conveyor when said silage reaches a predetermined level,
   (e) said control arm returning to said horizontally disposed position under said yielding bias and terminating delivery movements of said discharge conveyor when said accumulated silage drops below a predetermined level,
   (f) both of said levels maintaining said silage at a sufficient level about said discharge conveyor to effect an air lock.

7. The structure defined in claim 6 in further combination with means within said leg and in overlying relationship to said delivery auger for maintaining said accumulated silage in the bottom of said leg in agitated condition whereby to prevent the formation of air pockets.

8. The structure defined in claim 6 in further combination with means for varying the rate of delivery of said discharge auger.

References Cited by the Examiner

UNITED STATES PATENTS

| | | | |
|---|---|---|---|
| 2,335,192 | 11/1943 | Moore | 99—189 X |
| 2,353,029 | 7/1944 | Graham | 99—8 |
| 2,617,351 | 11/1952 | Graham et al. | 99—235 |
| 2,704,995 | 3/1955 | Dueringer | 119—52 |
| 2,863,575 | 12/1958 | Vasold | 214—17 |
| 2,981,402 | 4/1961 | Cleaveland | 119—52 |
| 3,067,914 | 12/1962 | Ellaby | 214—17.82 |
| 3,071,061 | 1/1963 | Collins et al. | 99—235 |
| 3,092,010 | 6/1963 | O'Dell | 99—235 |
| 3,113,655 | 12/1963 | Adler | 214—17 X |

OTHER REFERENCES

German printed application M#16,476, September 1955, Kl 81e,133.

WALTER A. SCHEEL, *Primary Examiner.*

IRVING BUNEVICH, *Examiner.*

CLYDE I. COUGHENOUR, *Assistant Examiner.*